United States Patent [19]

Miyazawa

[11] Patent Number: 4,885,730

[45] Date of Patent: Dec. 5, 1989

[54] ANALOG ELECTRONIC TIMEPIECE USING AN INTERMITTENT DRIVING SIGNAL

[75] Inventor: Osamu Miyazawa, Suwa, Japan

[73] Assignee: Seiko Epson Corporation, Tokyo, Japan

[21] Appl. No.: 114,315

[22] Filed: Oct. 28, 1987

[30] Foreign Application Priority Data

| | | | |
|---|---|---|---|
| Oct. 28, 1986 | [JP] | Japan | 61-256311 |
| Nov. 7, 1986 | [JP] | Japan | 61-265204 |
| Nov. 28, 1986 | [JP] | Japan | 61-183447[U] |
| Feb. 27, 1987 | [JP] | Japan | 62-28636[U] |
| Feb. 27, 1987 | [JP] | Japan | 62-28635[U] |
| Mar. 9, 1987 | [JP] | Japan | 62-53454 |
| Jun. 3, 1987 | [JP] | Japan | 62-139281 |
| Jul. 6, 1987 | [JP] | Japan | 62-168179 |

[51] Int. Cl.[4] .................... G04C 3/00; H02K 49/10

[52] U.S. Cl. .................................... 368/157; 368/160; 310/104; 310/15

[58] Field of Search ................ 368/157, 160, 163, 175

[56] References Cited

U.S. PATENT DOCUMENTS

| | | | |
|---|---|---|---|
| 3,961,213 | 6/1976 | Koike et al. | 368/168 |
| 3,978,654 | 9/1976 | Koike et al. | 368/155 |

FOREIGN PATENT DOCUMENTS

| | | |
|---|---|---|
| 52-112362 | 4/1979 | Japan . |
| 599581 | 7/1977 | Switzerland . |
| 1441210 | 6/1976 | United Kingdom . |

*Primary Examiner*—Bernard Roskoski
*Attorney, Agent, or Firm*—Blum Kaplan

[57] ABSTRACT

An electronic timepiece provides continuous rotation for a hand in response to a discrete driving rotation. An energy storage mechanism is coupled to the discrete driving rotation and converts the discrete driving rotation into stored energy. A control mechanism continuously releases the stored rotational energy as continuous rotation. A linkage coupled between the energy storage mechanism and control mechanism transmits continuous rotation therebetween and drives the hand in a continuous sweeping manner.

31 Claims, 10 Drawing Sheets

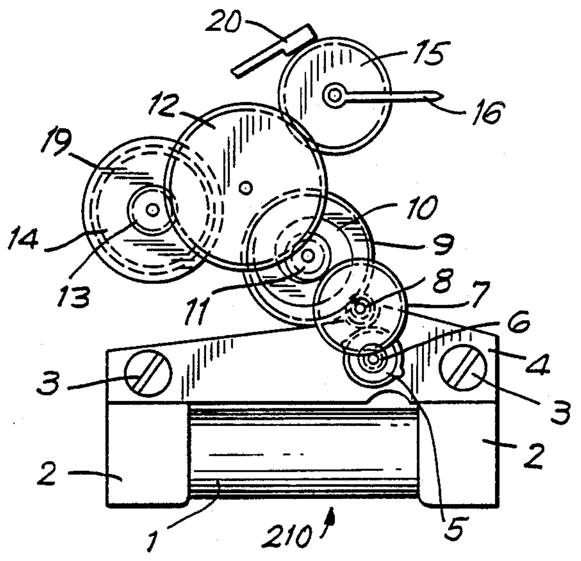
FIG. 3
FIG. 6
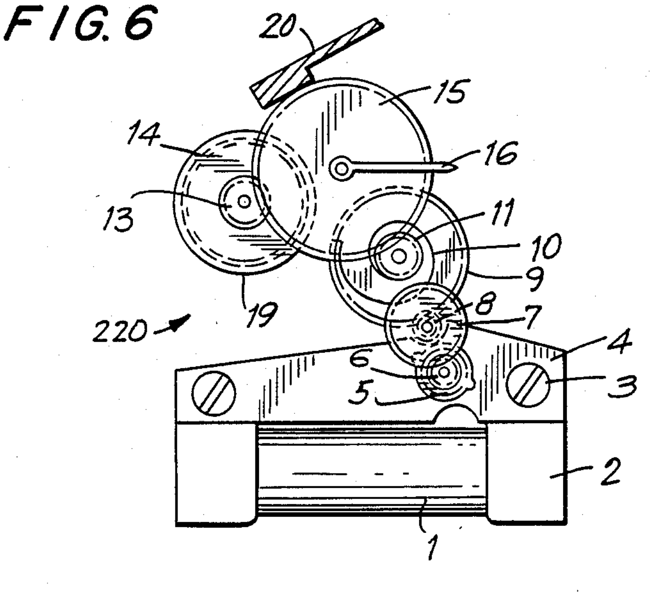

FIG. 19
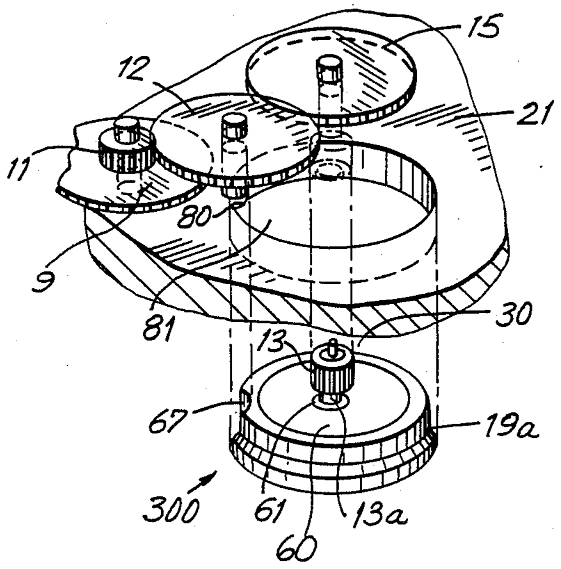
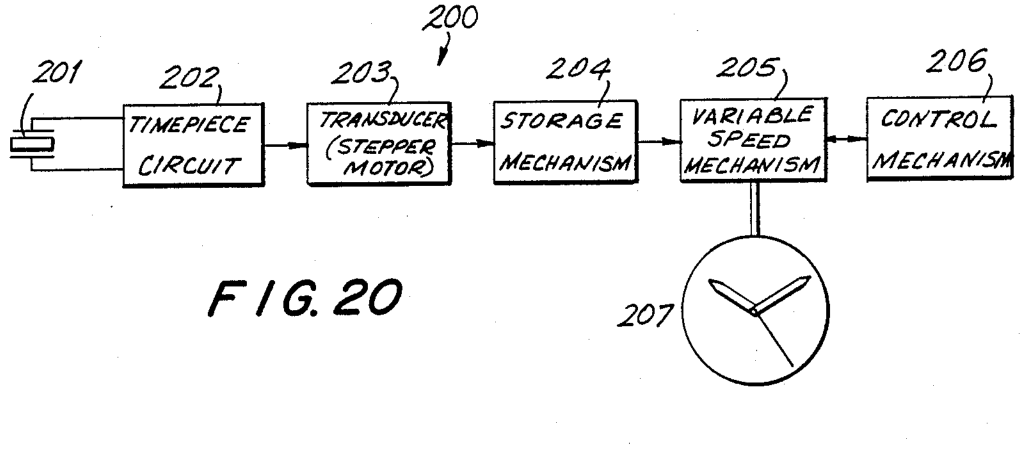
FIG. 20

ANALOG ELECTRONIC TIMEPIECE USING AN INTERMITTENT DRIVING SIGNAL

BACKGROUND OF THE INVENTION

The invention is generally directed to an electronic timepiece which provide for continuous hand movement and in particular to an analog electronic timepiece which provides continuous and smooth hand movement from a discrete timepiece movement.

Reference is made to FIG. 1 wherein a timepiece, generally indicated as. 100, constructed in accordance with Japanese Patent Publication No. 56-47512 is shown. Timepiece 100, which is only shown in partial relevant section, includes a drive train 101, shown schematically, power gear 102 and power pinion 109 supported by pivots 105 and 119 between main plate 117 and gear train bridge 123. Pivot 119 is supported in pivot support 121 on main plate 117, which is secured in place by screw 112.

Pinion 109 drives third gear 122 which is supported by pivots 106. Third pinion 110, which is fixed to third gear 122, in turn drives minute hand gear 108. To produce a continuous motion of the second hand or sweep second hand, power pinion 109 drives driving magnet 115. Driving magnet 115 is supported by magnet support 114, which is directly coupled to power pinion 109. A first following magnet 116 is enclosed by a viscous fluid 113, thereby producing viscous resistance to rotation. First following magnet 116 and viscous fluid 113 are supported by support plate 120 on main plate 117. First following magnet 116 is driven by the attractive force of driving magnet 115. A second following magnet 118 is driven by first following magnet 116. Second following magnet 118 is coupled to second hand display shaft 111. In this way, the conventional analog electronic timepiece with a discrete time keeping movement provides for continuous hand movement.

In this type of conventional timepiece, the portion of the timepiece which stores the rotary energy and the portion which gradually releases the rotary energy is formed as a single member, i.e. the driving magnet and following magnets. This results in several problems. If the size or configuration of the following magnet is changed to vary the amount of energy which can be stored, the viscous resistance to the viscous fluid tends to change, thereby resulting in jerky, non-smooth hand movement. On the other hand, if the size of the gap between the following magnet and main plate is changed, the magnitude of the magnetic attractive force tends to vary.

Variations in the phase deviation, i.e. the angle between the driving magnet and the first following magnet on the one hand and the angle between the first following magnet and the second following magnet on the other hand, cause the attractive or repulsive forces along the axial direction of the magnets to change. This results in the magnets, and particularly the first following magnet shown in FIG. 1, moving upward or downward within the limits of the clearance providing by the viscous fluid. The movement of the first following magnet within the cavity of viscous fluid changes the viscous resistance to movement of the first following magnet. It also changes the orientation of the magnet which causes changes in friction due to the thrust force and the direct friction of the edges of the first following magnet against the main plate. A non-uniformity of rotation is the result.

In addition, the conventional timepiece of the type shown in FIG. 1 has a multiple step structure, which makes it difficult to reduce the thickness of the timepiece, and also results in there not being enough of a span between the bearings. The axes for supporting the hand are unstably supported and the hand tends to become undesirably tilted during operation.

Another problem with the conventional structure is the sine wave relationship between the magnetic attractive force and the rotational angle. As a result, when the angle between the driving magnet, and the first following magnet or the first following magnet and the second following magnet is greater than 90°, the magnitude of the restoring force is reduced for increased angular deviation and the magnet system does not properly function to control the rotation of the following magnet. When the angle between the magnets is about either 0° or 90°, the restoring force barely changes as the angle between the magnets changes so that responsive speed control is not achieved. This is seen by examination of a sine curve at 0° or 90° where the rate of change in amplitude per change in angle is small. As a result, when the angle between the magnets is at 0° or 90°, due to fluctuations or changes in the viscous load, the speed is not effectively controlled.

In a real world situation there are many forces which result in fluctuations in the magnet attractive force and viscous load or fluctuations due to the dimensional accuracy and uneven magnetization. These stresses to the system may result in angles between the driving magnet and the following magnet being occasionally greater than 180°. In these situations the following magnet not only fails to correctly control the speed, but it in fact rotates in the opposite direction. Thus an inappropriate time is displayed.

Further, because the magnets are rotated in the timepiece, there is magnetic interference betweent the magnets and the stepping motor. As a result, the layout of the components is severely restricted. In addition, viscous fluids having a very high viscosity is required to obtain the high viscous resistance at low rotary speed required by the conventional arrangement which requires as many rotary magnet assemblies as there are hands. This increases the cost and difficulty of assembling the timepiece.

Accordingly, there is a need for an improved timepiece which converts the discrete movement of the timekeeping circuitry and step motor to continuous movement of the hand which is reliable, effective, relatively insensitive to internal and external stresses, compact, easy to repair and adaptable to a thin timepiece.

SUMMARY OF THE INVENTION

The invention is generally directed to an electronic timepiece for providing continuous rotation of a hand in response to a discrete driving rotation. The timepiece includes an energy storage mechanism coupled to the discrete driving rotation for converting the discrete driving rotation to stored energy. A control mechanism continuously releases the stored rotational energy as continuous rotation. A linkage mechanism coupled between the energy storage mechanism and control mechanism transmits the continuous rotation from the energy storage mechanism to the control mechanism. The hand is coupled to the linkage mechanism for providing a continous sweep hand movement.

Accordingly, it is an object of the invention to provide an improved electronic timepiece which converts a stepped timepiece drive mechanism to continuous sweeping hand movement.

A further object of the invention is to provide an improved timepiece for converting discrete driving rotary movement of a timepiece to a continuous sweeping hand movement by use of an energy storage system separately formed from a control mechanism for producing substantially constant speed rotary motion.

Another object of the invention is to provide an improved analog-type electronic timepiece in which a stepping motor which is intermittently rotated by signals provided from reference signals drives a display mechanism to display time incorporating a storage mechanism for storing the rotary energy of the stepping motor and a control mechanism for gradually releasing the rotary energy in the form of smooth rotary motion where both the storage mechanism and control mechanism are separately provided in the electronic timepiece.

A further object of the invention is to provide an improved analog-type electronic timepiece in which a stepping motor which is intermittently rotated by signals divided from reference signals drives a display mechanism in a continuous sweeping manner utilizing a hairspring to store the rotary energy of the stepping motor and a rotor in a viscous fluid to control the release of the energy in a substantially continuous manner.

Still another object of the invention is to provide an analog-type electronic timepiece in which a stepping motor which is intermittently rotated by signals divided from reference signals drives a display mechanism in a sweeping continous manner utilizing a magnetic escapement as the control means and a first following magnet as the storage mechanism to convert the stepwise rotation of the step motor to continous sweeping motion of a hand.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a plan view of the electronic timepiece of FIG. 2;

FIG. 6. is a plan view of a portion of an electronic timepiece in accordance with a second embodiment of the invention;

FIG. 19 is a partially exploded, cut away perspective view of an electronic timepiece with a removable control mechanism in accordance with the invention; and FIG. 20 is a functional block diagram of an electronic timepiece in accordance with the invention.

DETAILED DESCRIPTION OF THE PREFERRED EMBODIMENTS

Figure 1:
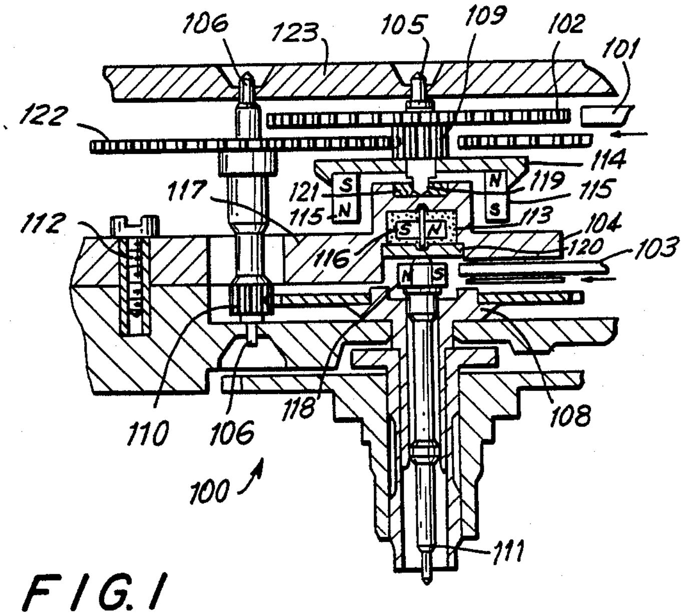
FIG. 1 PRIOR ART
FIG. 1 is a partial sectional view of a conventional electronic timepiece.

Reference is first made to FIG. 20 wherein a timepiece 200 constructed in accordance with the invention is depicted. Timepiece 200 includes a quartz crystal oscillator 201, a timepiece circuit 202 which divides the reference signal from oscillator 201 and generates discrete driving signals for driving transducer 203. Transducer 203 is a stepping motor in a preferred embodiment. A storage mechanism 204 saves the rotary energy generated by transducer 203. Control mechanism 206 gradually releases the stored energy in the form of smooth rotary motion. The storage mechanism is connected to the control mechanism through variable speed mechanism 205. Variable speed mechanism 205 drives display mechanism 207.

In a structure of the type shown in FIG. 20 the storage mechanism is separated from the control mechanism. As a result, a timepiece produced in accordance with the present invention can be constructed with desirable characteristics such as size and thickness characteristics. In addition, the separation of the storage mechanism and control mechanism simplifies repair of the timepiece after assembly.

Figure 2:
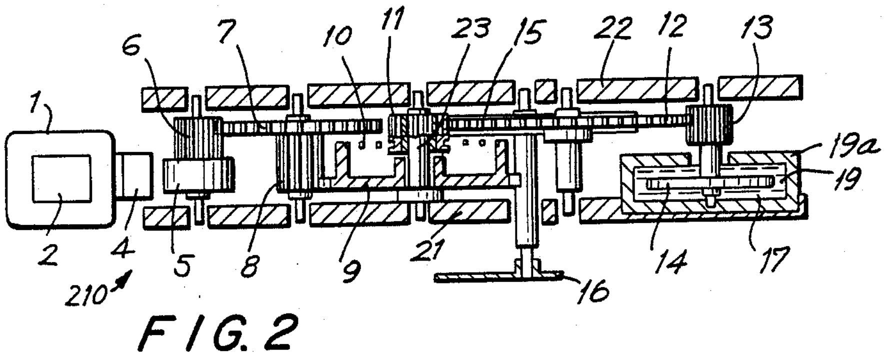
FIG. 2 is a sectional view of an electronic timepiece in accordance with a first embodiment of the invention.

Reference is next made to FIGS. 2 and 3 wherein an electronic timepiece, generally indicated as 210 constructed in accordance with a first embodiment of the invention is depicted. FIG. 2 is a sectional view of timepiece 210 and FIG. 3 is a plan view of timepiece 210.

Timepiece 210 includes a coil 1 wound around around core 2 having a stator 4. Stator 4 drives rotor 5 in a stepwise fashion. Sixth pinion 6 which engages with rotor 5 drives fifth gear 7 which engages with fifth pinion 8. Fifth pinion 8 drives hairspring gear 9, which is coupled to one end of hairspring 10. The other end of hairspring 10 is coupled to hairspring pinion 11. Hairspring pinion 11 engages with idler gear 12, which in turn engages with viscous rotor pinion 13. Viscous rotor pinion 13 is fixed to viscous rotor 14, which is enclosed within cavity 19 and surrounded by viscous fluid 17. In a preferred embodiment, viscous fluid 17 is a silicon oil. Hand 16 is coupled to fourth gear 15, which in turn engages with viscous rotor pinion 13 through fourth idler gear 12, and is rotated at a speed ratio corresponding to the number of gear teeth. Rotor 5, sixth pinion 6, fifth pinion 8, fifth gear 7, a winding stem 23 and idler gear 12 are supported between a gear train bridge 22 and a main plate 21. Viscous rotor pinion 13 and viscous rotor 14 are supported for rotation between gear train bridge 22 and a cavity member 9*a*. Coil 1 is fixed to main plate 21 by screw 3.

Electronic timepiece 210 uses hairspring 10 as the storage means and utilizes viscous rotor 14, with the viscous load of viscous fluid 17, as the control mechanism. The gear train, as described above is provided between main plate 21 and gear train bridge 22. Coil 1 generates a magnetic field for driving rotor 5 through stator 4 and magnetic, core 2. Rotor 5 drives hairspring gear 9 through a reduction gear train including sixth pinion 6, fifth gear 7 and fifth pinion 8. The reduction rate "a" is represented as $a \geqq \sqrt{K2/TM}$ where rotor 5 rotates through an angle $\alpha°$ for each step, the generated torque is TMgmm, and the spring constant of the hairspring is Kgmm/°. On the other hand, the motion of hairspring pinion 11 is controlled by viscous rotor 14 through viscous rotor pinion 13 and idler gear 12.

Since fourth gear 15, with hand 16 thereon is engaged with viscous rotor pinion 13 through fourth idler gear 12, fourth gear 15 is rotated at a speed ratio corresponding to the number of teeth on the gears. Hairspring gear 9 and hairspring pinion 11 can be independently rotated about winding stem 23 around the same axis. Hairspring gear 9 is coupled to hairspring pinion 11 through hairspring 10.

When rotor 5 is driven in a stepwise fashion, hairspring gear 9 is also rotated in a stepwise or discrete fashion. However, hairspring pinion 11 is continuously and smoothly rotated since its rotation is controlled by the force applied through hairspring 10 and the viscous resistance of viscous fluid 17 surrounding viscous rotor 14. Hairspring 10 permits a difference or angular deviation between stepwise rotated hairspring gear 9 and continuously rotated hairspring pinion 11. Hairspring 10, the gear train and the viscous rotor 14 form a vibrating system in which the viscous resistance is set with substantial over-damping so that the system can effectively and reliably perform even with great variations in external stresses and turbulences.

Viscous rotor 14 converts the rotary energy stored in hairspring 10 into a constant rotary speed corresponding to the elastic deformation restoring force of hairspring 10. Hairspring 10 functions as a storage mechanism for storing the intermittently generated rotary energy in rotor 5. Since the torque balance can be set as desired, the size, lay out of components and viscosity of the viscous fluid can be easily selected.

Figure 4:
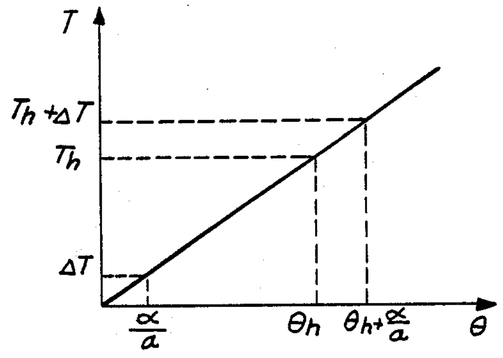
FIG. 4 is a graphical representation of the relationship between the wrapping angle of the hairspring and the restoring force of the hairspring.

Reference is next made to FIG. 4 wherein the relationship between the wrapping angle of the hairspring $\theta_h$ and the restoring force $T_h$ of the hairspring is shown. The graph shows the relationship between the torque $T_h$ necessary to restore the hairspring through angle $\theta_h$ and the increment $\Delta T$ to achieve a wrapping angle $\alpha/a$ per stepping motor step. FIG. 4 also shows the effect of an increase of $\alpha/a$ in the wrapping angle on torque when the hairspring is already wrapped at angle $\theta_h$. As clearly seen FIG. 4, there is a linear relationship between the restoring force and wrapping angle.

Figure 5:
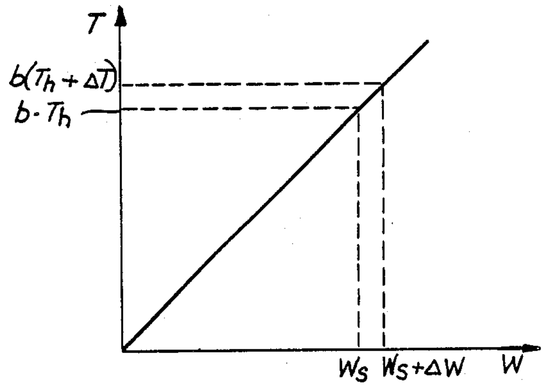
FIG. 5. is a graphical representation of the relationship between the angular velocity of the viscous rotor and the load torque thereon.

Reference is next made to FIG. 5 wherein the relationship between the angular velocity $W_s$ of the viscous rotor and the load torque $T_h$ against the rotation of the viscous rotor as the timepiece hand sweeps, i.e. moves smoothly continuously at a constant speed. When the reduction ratio of the gear train between the hairspring and the viscous rotor is b, the angular velocity $W_s$ and $W_s + \Delta W$ correspond to load torques of $b \cdot (T_h)$ and $(T_h + T)$ respectively. Thus, to assure that the hand moves smoothly, the fraction $\Delta W/W_s$ should be reduced. That is, the fraction $\Delta T/T_h$ should be reduced. When the value of $b \cdot (T_h)$ is greater than the torque $\Delta T$ for a single step, the viscous rotor will rotate with the angular velocity $W_s$ in a condition in which the hairspring stores the torque associated with several steps so that smooth angular rotation is achieved. To achieve this result the spring constant of hairspring 10 may be lowered or the viscous load presented by viscous fluid 17 to viscous rotor 14 may be increased.

In the structure described above, the viscous rotor rotates at the constant speed at which the torque of the hairspring is balanced with the load torque. The load torque of the viscous rotor is proportional to the angular velocity of the viscous rotor, thereby preventing the hairspring pinion from changing speed. As a result, the hand movement is smooth and constant and does not move in discrete increments.

Even if the load torque changes in accordance with the change of viscosity, continuous and smooth hand movement is achieved. Although the wrapping angle of the hairspring is increased or decreased, because the hairspring is made of a desirably elastic material continuous sweeping movement is still present. Even under this situation, the hand keeps moving as long as the stepping motor does not stop.

When timepiece 210 is to be set to the correct time, the operation of the timepiece is controlled by a control lever 20 which interrupts the movement of fourth gear 15 and thereby stops the hand movement and the movement of viscous rotor 14. However, because hairspring 10 is elastically deformed when the hand movement is stopped, continuous sweeping hand movement will resume as soon as the control lever 20 is released. When timepiece 210 is violently disturbed, the viscous rotor controls the extra rotation and elastic deformation of hairspring 10 and the position of the hand is correctly displayed in smooth fashion. Since the hairspring can provide reverse torque to rotor pinion 13, further stability against external turbulance is provided, allowing the gear train including viscous rotor pinion 13, viscous rotor 14, idler gear 20 and fourth gear 15 to rotate in both a forward and a reverse direction.

Reference is next made to FIG. 6 wherein an electronic timepiece 220 constructed in accordance with a second embodiment of the invention is depicted. Like reference numerals refer to like elements. Electronic timepiece 220 delivers stepwise or incremental rotational energy to hairspring 10 in the same fashion as does timepiece 210 shown in FIGS. 2 and 3. The rotational force from hairspring 10 delivered to hairspring pinion 11 is directly transmitted to meshing fourth gear 15. Viscous rotor 14 controls the angular velocity of fourth gear 15 and thereby controls the release of energy from hairspring 10 through rotor pinion 13. In this structure, the size of the gear train is reduced and the compactness and cost reduction of the timepiece construction is improved.

In addition, since the members of the gear train from the hairspring 10 to viscous rotor 14 (i.e. hairspring pinion 11, fourth gear 15 and viscous rotor pinion 13) also function to transmit the stored energy, any backlash is prevented by the force stored in hairspring 10 so that hand 16 correctly operates.

Figure 7:
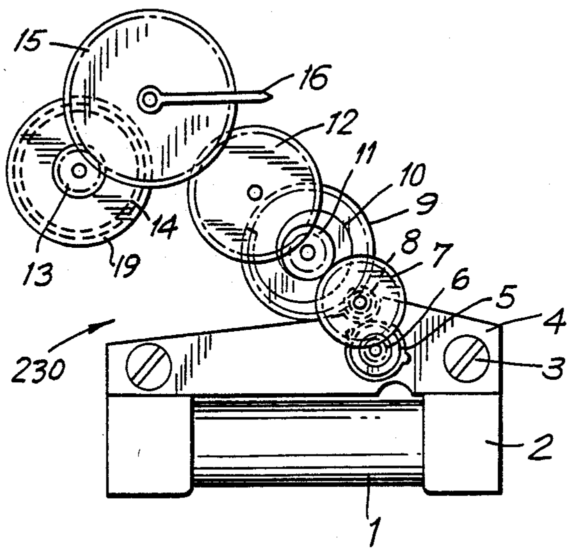
FIG. 7 is a plan view of a portion of an electronic timepiece in accordance with a third embodiment of the invention.

Reference is next made to FIG. 7 wherein an electronic timepiece, generally indicated as 230, constructed in accordance with a third embodiment of the invention is depicted. Like elements are represented by like reference numerals. A fourth idler gear 12 is provided between fourth gear 15 and hairspring pinion 11 so that a large amount of spacing is provided between the respective axes of fourth gear 15 (and the display hand 16 which is coaxial therewith) and hairspring gear 9 so that additional flexibility of gear placement within timepiece 230 is available to minimize the thickness of the timepiece.

Figure 8:
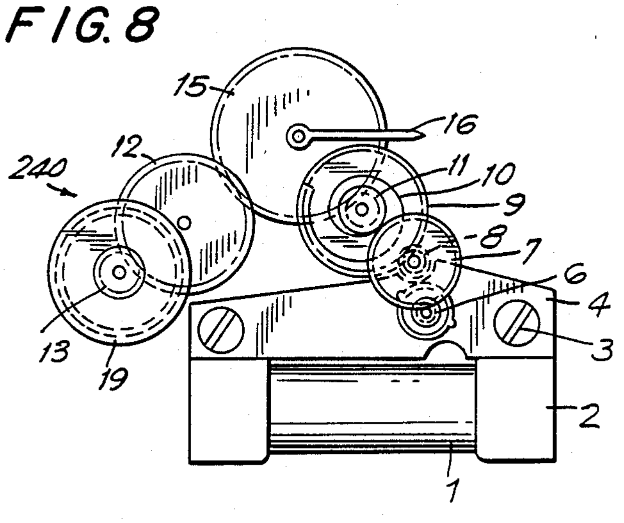
FIG. 8 is a plan view of an electronic timepiece in accordance with a fourth embodiment of the invention.

Reference is next made to FIG. 8 wherein as electronic timepiece, generally indicated as 240, constructed in accordance with a fourth embodiment of the invention is depicted. Like elements are represented by like reference numerals. Idler gear 12 is provided between fourth gear 15 and viscous rotor pinion 13 so that fourth gear 15 and cavity 19 can be spaced apart within electronic timepiece 240 to provide increased flexibility of arrangement of components which aids in reducing the thickness of the timepiece.

Figure 9:
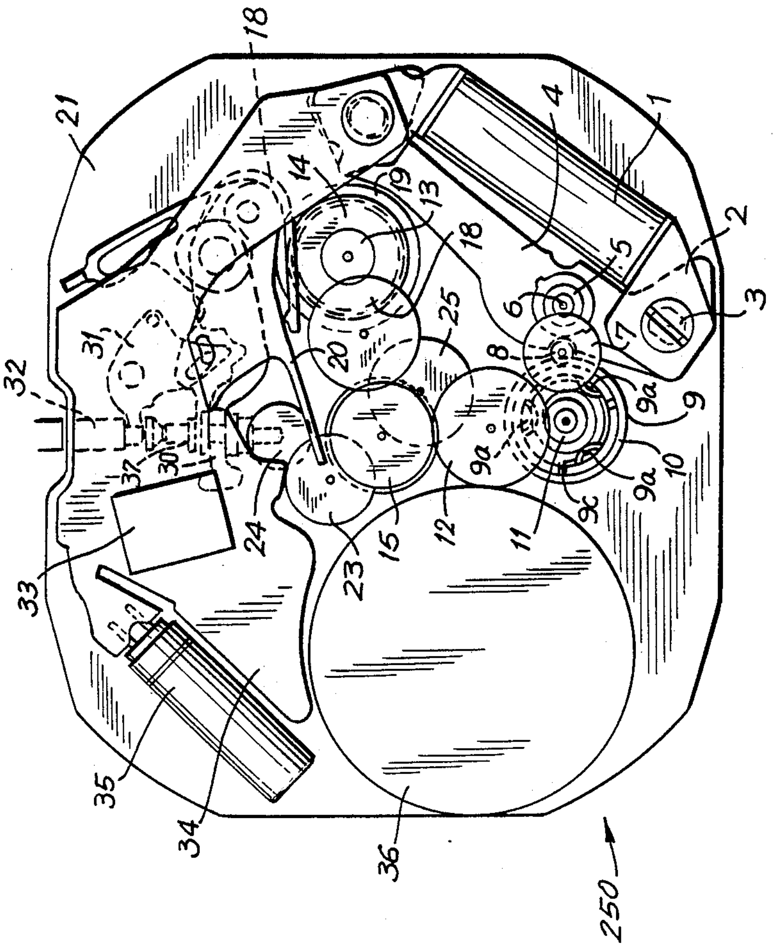
FIG. 9 ia a plan view of an electronic timepiece constructed in accordance with a fifth embodiment of the invention.

Reference is next made to FIG. 9 wherein an electronic timepiece, generally indicated as 250, constructed in accordance with a fifth embodiment of the invention is depicted. Like elements are represented by like reference numerals. FIG. 9 shows some of the additional conventional components included in an electronic timepiece, excluded in FIGS. 2–3 and 6–8 to simplify explanation of the invention. Timepiece 250 includes a battery 36, a quartz vibrator 35, a circuit substrate 34 and an integrated timekeeping circuit 33. The driving waveforms to drive rotor 5 of the stepping motor is supplied to coil 1 through circuit substrate 34 by intergrated circuit 33 and Quartz vibrator 35. A time setting gear 24 engages with a time setting lever 31, in response to the operation of a winding stem 32, and engages with clutch gear 37 in response to the operation of a yoke 30. This makes it possible to change the locations of the hands. A third gear 25 steps down the rotation of fourth gear 15, which engages with the second hand, to drive the minute hand. A minute gear 23 engages with setting gear 24.

Hairspring 10 is prevented from moving along its axis by lips 9*a*. A groove 9*c* in hairspring gear 9, to which the end of hairspring 10 is coupled, allows the torque to be transferred from hairspring gear 9 to hairspring 10. A fourth idler gear 12 is disposed between and engages hairspring pinion 11 and fourth gear 15. A viscous rotor idler gear 18 is disposed between fourth gear 15 and viscous rotor pinion 13. Fourth idler gear 12 and viscous rotor idler gear 18 allow for greater separation of the various gear components and cavity 19 so that they may be spaced apart and thereby reduce the overall thickness of timepiece 250.

By utilizing the construction shown in FIG. 9, the viscous rotor 14 and hairspring gear 9 can easily be arranged without overlying so that a particularly thin timepiece can be easily constructed. The invention is not limited to the particular physical arrangement of the various elements shown in the figures and may be adapted to any appropriate arrangement in accordance with the specific needs and other timepiece elements present.

Figure 10:
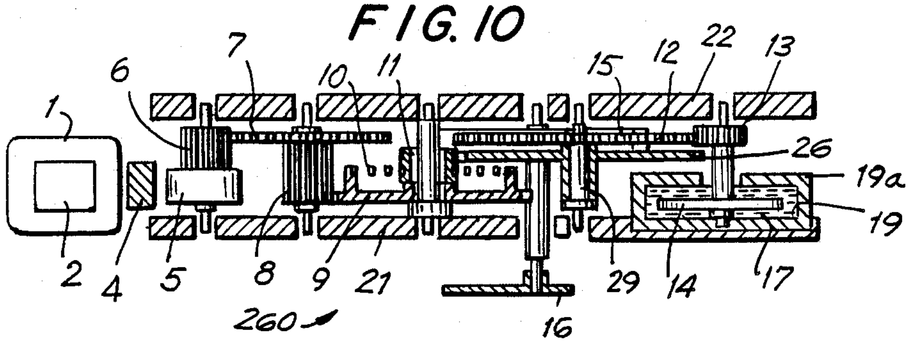
FIG. 10 is a sectional view of an electronic timepiece in accordance with a sixth embodiment of the invention.

Reference is next made to FIG. 10 wherein an electronic timepiece, generally indicated as 260, constructed in accordance with a sixth embodiment is depicted. Like elements are represented by like reference numerals. In timepiece 260, hairspring 10 is utilized as the storage mechanism for storing the angular energy produced by the stepping motor and viscous rotor 14, which is loaded with the viscous load of viscous fluid 17, is utilized as the control mechanism. The timepiece elements shown, except for hand 16 and the shaft through which it is attached to fourth gear 15, are all located between a main plate 21 and a gear train bridge 22. This provides for a sturdy but thin timepiece. A coil 1 drives rotor 5 through a stator 4 with a magnetic core 2 defining a magnetic flux field. Hairspring pinion 11 and hairspring gear 9 are connected to the opposite ends of hairspring 10. Hairspring 10 is wound by the stepwise rotation of rotor 5 through the gear train including fifth gear 7, fifth pinion 8 and hairspring gear 9. The rotation of fourth gear 15 is controlled by viscous rotor 14, which is supported between gear train 22 and cavity member 19*a*, through viscous rotor pinion 13 and viscous rotor idler gear 26.

Hairspring gear 9 and hairspring pinion 11 are allowed to freely rotate on the same axis while fourth idler gear 12 and viscous rotor idler geat 26 are rotatably monted on idler axis 29, the range of rotation being greater than the range of the backlash to engage with fourth gear 15. With this construction, when rotor 5 is driven in a stepwise or intermittent fashion, the angular velocity of hairspring pinion 11 is controlled by viscous rotor 14, which has a load torque which varies directly with the angular velocity of viscous rotor 14 through fourth idler gear 12, viscous rotor idler 26 and fourth gear 15. As a result, the angular deviation between intermittently driven hairspring gear 9 and hairspring pinion 11 is absorbed as stored energy by hairspring 10 so that hairspring pinion 11 can rotate continuously and smoothly at a constant speed corresponding to the elastic deformation restoring force of hairspring 10.

Figure 11:
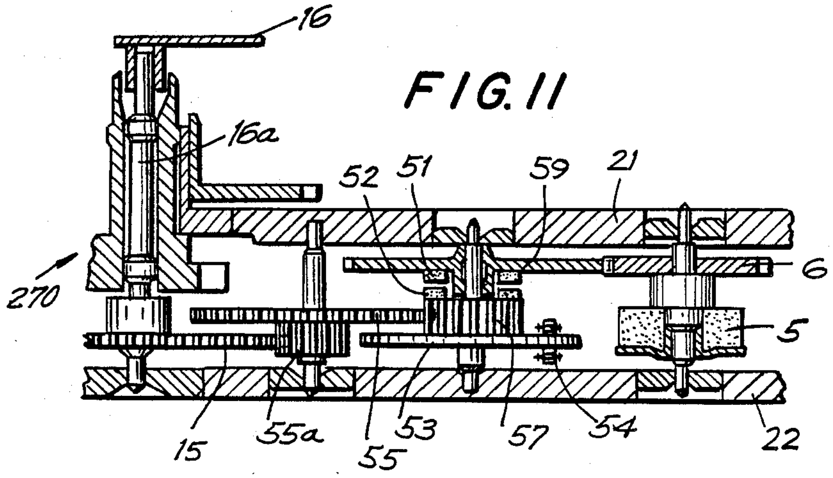
FIG. 11 is a partial sectional view of an electronic timepiece utilizing a magnetic escapement in accordance with a seventh embodiment of the invention.

Reference is next made to FIG. 11 wherein an electronic timepiece, generally indicated as 270 constructed in accordance with a seventh embodiment of the invention is depicted. Like elements are represented by like reference numerals. Electronic timepiece 270 utilizes a magnetic escapement as the control mechanism and a first following magnet as the storage mechanism. A driving magnet 51 is coupled to a driving gear 59 for rotation therewith. Driving gear 59 is driven in a stepwise manner by rotor gear 6 which is coupled to rotor 5. A first following magnet 52 is spaced a small distance away from driving magnet 51. First following magnet 52 is coupled to a following pinion 57, which in turn is connected to an escapement gear 53. Following pinion 57 is coupled to fourth gear 15 (and hand 16, coupled through a shaft 16*a*), through idler gear 55 and idler pinion 55*a*.

A magnetized pendulum 54 is attracted to the teeth of escapement gear 53 by magnetic force resulting from the rotation of escapement gear 53.

Figure 13:
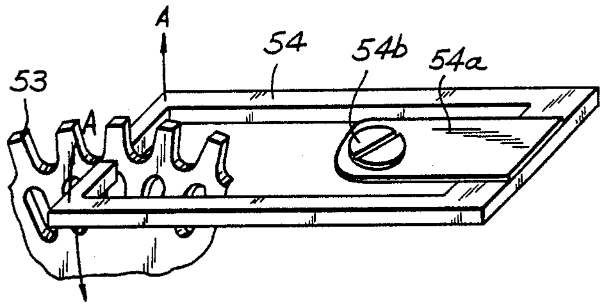
FIG. 13 is an enlarged partially cut away perspective view of the magnetic escapement of the timepiece of FIG. 11.

The construction of escapement gear 53 and magnetized pendulum 54 is shown in greater detail in FIG. 13. As escapement gear 53 rotates due to the driving force applied to first following magnet 52 by driving magnet 51, pendulum 54 begins to vibrate. Pendulum 54 quickly comes to vibrate at a resonant frequency or other stable frequency which then acts as a control on the rotation of escapement gear 53 and, hand 16 through the gear train connecting them.

In this arrangement, the regular application of angular energy applied to first following magnet 52 at regular intervals in response to the movement of the stepping motor, results in a uniform speed and excellent sweep hand movement. Magnet pendulum 54 includes a mounting member 54*a* mounting pendulum 54 on the main plate 21, gear train bridge 22 or other structure with mounting member 54*b*. Magnetic pendulum 54 is vibrated at its distinctive frequency in the direction of arrows A (FIGS. 11, 13). Magnetic pendulum 54 does not physically contact escapement gear 53, as seen more clearly in FIG. 13. This minimizes the friction in the system and the resulting power loss and increases the precision of vibration of pendulum of member 54. Accuracy of rotation of escapement gear 53 and hand 16 are thus improved.

Figure 12:
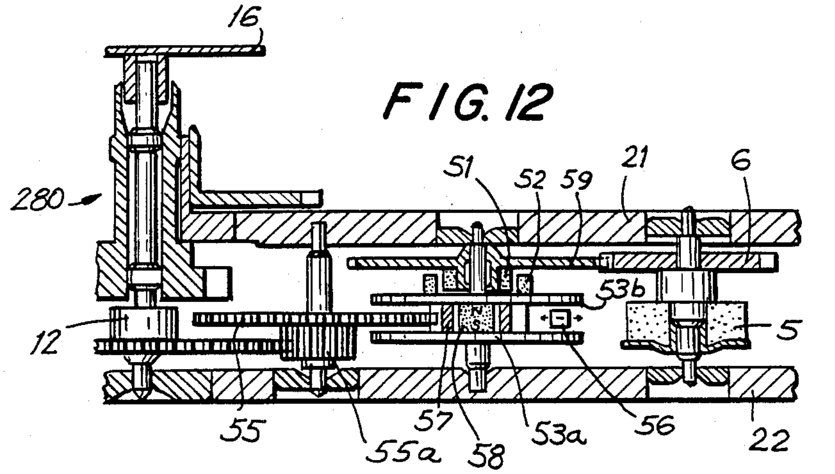
FIG. 12 is a partial sectional view of an electronic timepiece utilizing a magnetic escapement in accordance with an eighth embodiment of the invention.
Figure 14:
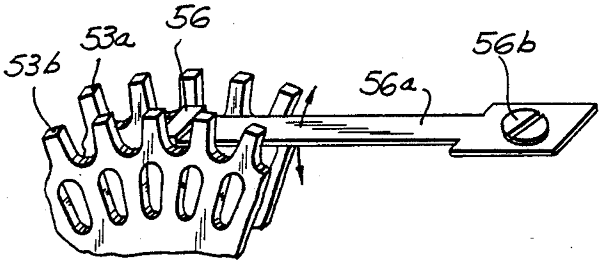
FIG. 14 is an enlarged partially cut away perspective view of the magnetic escapement of the timepiece of FIG. 12.

Reference is next made to FIGS. 12, 14 wherein an electronic timepiece generally indicated as to 80, constructed in accordance with an eighth embodiment of the invention is depicted. Like elements are represented by like reference numerals. Whereas pendulum 54 surrounds escapement gear 53 on both sides in timepiece 270 shown in FIG. 11, pendulum 56 in timepiece 280 is surrounded by two part escapement gear 53*a*, 53*b*. Pendulum 56 is made of a magnetic material and plate spring 56*a* is fixed in place by mounting member 56*b*. Pendulum 56 is attracted by the magnetic force when pendulum 56 leaves the magnetic flux of an attractive magnet 58 provided between escapement gears 53*a* and 53*b*. This construction enables a stronger magnetic flux to be produced than when a magnetized pendulum as shown in FIGS. 11, 13 is used so that a more accurate, continuous hand movement is achieved.

With the use of a magnetic escapement as the control mechanism as shown in FIGS. 11–14, the pendulum is only coupled to the teeth of the escapement gear or gears by a magnetic force. No direct physical contact between the teeth of the escapement gear and the pendulum is present. When the pendulum vibrates at its peculiar or resonant frequency the escapement gear is rotated at a uniform speed responsive to the external driving force supplied by driving magnet 51. Thus, the intermittent rotational energy generated by the transducer (step motor including rotor 5) is stored by the first following magnet as an angular deviation from driving magnet 51 and the stored energy is released to the escapement gear as a driving force under the control of the pendulum. The escapement gear is thus rotated at a substantially uniform speed until driving magnet 51 ceases to provide rotational energy. However, once driving magnet 51 again begins to rotate, sweeping hand movement again commences. At this time, since the frequency may have been altered slightly by the change in load (i.e. the vibrational amplitude), even if the distinctive frequency is not accurately adjusted, the escapement gear rotates at an angular velocity directly proportional to the load of the attracting magnet and vibrating period. Even if the vibrating period of the pendulum changes due to external inputs such as a shock, and the magnetic connection is broken, after the stored rotational energy is released, the hand movement will stop. Thereafter, once rotor 5 again begins rotating which causes the rotation of driving magnet 51, continuous movement of the hand will start again. Thus, if the driving magnet is driven by a quartz crystal oscillator or the like, synchronous continuous driving of hand 16 will continue for a relatively long time.

Accordingly, in timepieces 270 and 280 shown in FIGS. 11–14, sweeping hand movement at a uniform speed is achieved without any harmful affects on the driving power or variations due to temperature or even change in speed due to fluid leakage or the like. The non-contacting nature of the pendulum and teeth of the escapement gear serves to increase the durability of the system and reduce the consumption of energy so that batteries or other electric cells can drive the timepiece for extended periods of time.

Figure 15:
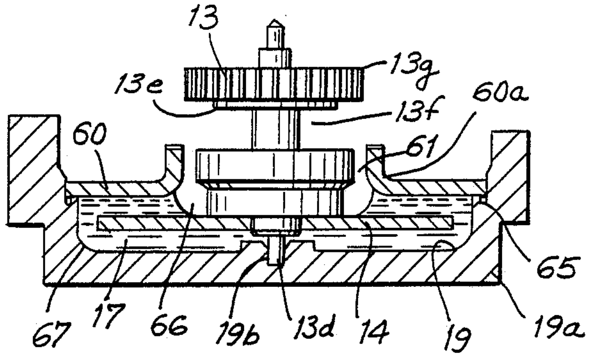
FIG. 15 is an enlarged sectional view of the viscous rotor and viscous fluid assembly in accordance with the invention.

Reference is next made to FIG. 15 wherein a control mechanism in accordance with the viscous fluid arrangement is depicted. Like elements are represented by like reference numerals. A rim member 13*e*, a first opening 13*f* and a second opening 66 are provided in viscous rotor pinion 13 which is integrally formed with a common rotational axis and structure with viscous rotor 14. A cavity 19 is defined by a cavity member 19*a* and encloses viscous rotor 14 and viscous fluid 17. Cavity member 19*a* has a groove 65 and a sloping portion 67. A cap 60 which has mating portion fitting into groove 65 acts to confine viscous fluid 17 to cavity 19. Sloping portion 67 allows the easy pouring of viscous fluid 17 into cavity 19 without spilling or splashing. cap 60 has a burring portion 60*a* which curves upwardly and forms a gap 61 with viscous rotor pinion 13.

Pinion 13*d* of viscous rotor pinion 13 is rotatably supported in cavity support portion 19*b*. Rim member 13*e* prevents viscous fluid which leaks out of cavity 19 from entering teeth 13*g*, in conjunction with first opening portion 13*f*. Second opening portion 66 provides additional space to deal with any thermal expansion of viscous fluid 17 due to variations in temperature. Groove 65 effectively joins with cap 60 to prevent leakage of viscous fluid around the edges of cavity 19. In addition, a sealing treatment on at least the engaging portion between cap 60 and cavity member 19*a* around groove 65 is performed to prevent any leakage around the edges of cavity 19. Burring portion 60*a*, in addition to providing a narrow gap 61 also serves to extend the length of the gap 61 so that leakage of the viscous fluid through gap 61 is prevented by the resistance to fluid flow of the long narrow gap.

Figure 16:
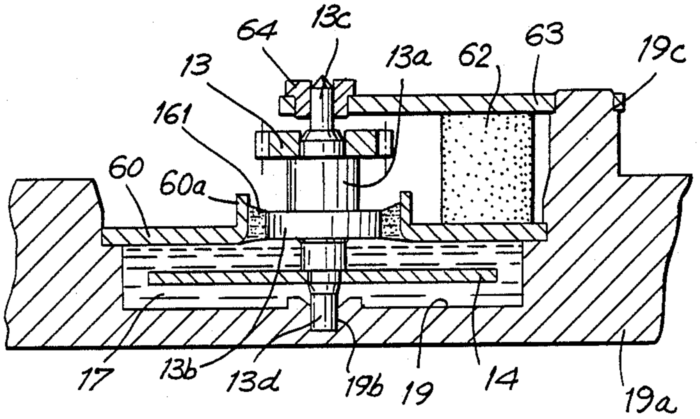
FIG. 16 is an enlarged partially cut away sectional view of the viscous rotor and viscous fluid assembly in accordance with another embodiment of the invention.

Reference is next made to FIG. 16 wherein a viscous rotor and viscous fluid assembly in accordance with another embodiment of the invention in which a magnetic fluid is utilized to seal cavity 19 is depicted. Like elements are represented by like reference numerals. Rather than having a open gap 61 as in the embodiment of FIG. 15, a magnetic fluid 161 is placed in gap 61 to prevent the outward flow of viscous fluid 17. A mounting portion 19*c* of cavity member 19*a* supports a yoke 63 which supports pivot frame 64 and confines magnet 62 between itself and magnetic cap 60. Magnetic axis 13*a* is formed of a magnetic material and serves as a rotating axis on which viscous pinion 13 is mounted for transmitting the frictional torque of viscous rotor 14 and viscous fluid 17 to the remaining portion of the drive train not shown in FIG. 16. A magnetic field is formed by yoke 63, pivot frame 64, pinion 13, axis 13*a*, cap 60 and burring portion 60*a* to trap magnetic fluid 161 in gap 61 between rotor yoke 13*b* and burring portion 60*a* of cap 60. In a construction such as shown in FIG. 16, the viscous fluid can be formed in a preferred embodiment of silicon oil with the magnetic fluid desirably formed of a fluorine solvent, thereby preventing the viscous fluid from leaking out of cavity 19.

Figure 17:
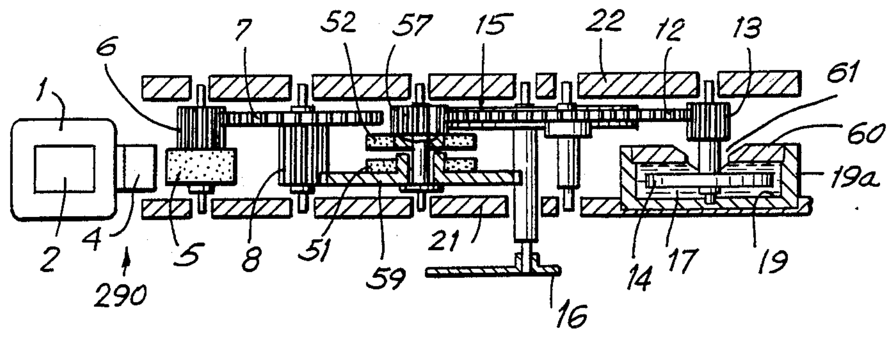
FIG. 17 is a sectional view of an electronic timepiece constructed in accordance with a ninth embodiment of the invention.

Reference is next made to FIG. 17 wherein an electronic timepiece generally indicated as 290 constructed in accordance with a ninth embodiment of the invention is depicted. Like elements are represented by like reference numerals. Timepiece 290 utilizes a pair of magnets, i.e. a driving magnet and a following magnet as the storage mechanism and a viscous fluid assembly as the control mechanism.

Rotor 5 of the stepping motor is rotated in response to the current supplied to coil 1, which is wound around magnetic core 2, through stator 4. Driving magnet 51, which is driven through the gear train including fifth gear 7, fifth pinion 8 and driving gear 59, stores the rotational energy of rotor 5 as the angular difference between driving magnet 51 and following magnet 52. The magnet attractive force increases as the angle between driving magnet 51 and following magnet 52 increases from 0° to 90°. Fourth idler gear 12 engages with fourth gear 15 which engages with hand 16, viscous rotor pinion 13 and following gear 57. Viscous rotor pinion 13 is connected to viscous rotor 14 which, as described above, is submersed in viscous fluid 17 within cavity 19. The angular deviation between driving magnet 51 and following magnet 52 is gradually restored and energy gradually released as the rotational speed of fourth idler gear 12 which is controlled by the viscous friction. As a result, indicating hand 16 smoothly rotates.

In the construction of timepiece 290, following magnet 52 is supported between gear train bridge 22 and main plate 21 so that a sufficient span and stability is achieved. In addition, because fourth idler gear 12 is separated from fourth gear 15, a thin timepiece is easily constructed without producing a tilted sweep second hand suffered by the prior art timepiece. An additional benefit of the separation of the storage mechanism formed of the magnets and the control mechanism including the viscous fluid assembly is the absence of interaction which ensures reliable continuous sweeping hand movement.

Figure 18:
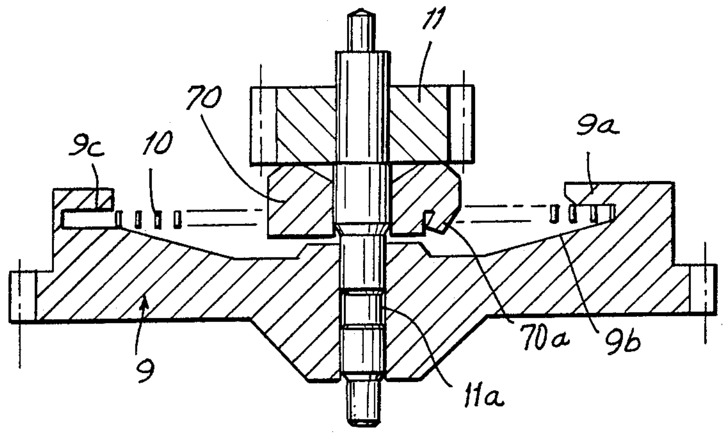
FIG. 18 is an enlarged sectional view of the hairspring assembly in accordance with the invention.

Reference is next made to FIG. 18 wherein an enlarged view of the hairspring gear 9, hairspring 10 and hairspring pinion 11 constructed in accordance with the invention is depicted. Like elements are represented by like reference numerals. Hairspring pinion 11 has a hairspring connector 70 within hairspring gear 9. Hairspring 10 is constructed so as to be enlarged upon application of a load and it is caulked to connector 70 at a caulking portion 70*a*. The inside end of coil hairspring 10 is connected to caulking portion 70*a*. The outside end of hairspring 10 is connected to hairspring gear 9 at groove portion 9*c*. In this way, hairspring 10 is coupled between hairspring gear 9 and hairspring pinion 11 so that rotational energy is stored as an elastic deformation of hairspring 10 dependent upon the angular deviation between hairspring gear 9 and hairspring pinion 11. Movement of hairspring 10 along the axis of hairspring gear 9 and hairspring pinion 11 is restricted by lip portions 9*a* shown also in FIG. 9 and sloping portion 9*b*. An escapement portion 11*a* is formed so as to prevent hairspring gear 9 and hairspring pinion 11 from contacting each other under various situations, such as when hairspring pinion 9 rocks from side to side.

This construction allows hairspring 10 to be easily assembled and, because the frictional load between hairspring pinion 11 and hairspring gear 9 is small, this construction provides excellent efficient sweeping hand movement.

Reference is next made to FIG. 19 wherein a portion of a semiconductor device 300 constructed in accordance with a tenth embodiment of the invention is depicted. Like elements are represented by like reference numerals. Electronic timepiece 300 is characterized by a removable control mechanism so that upon removal of the control mechanism intermittent hand movement is achieved.

The detachable control mechanism includes cavity member 19*a* with cap 60, viscous fluid 17 in cavity 19 (not shown) and viscous rotor 14 (not shown) and viscous rotor pinion 13 assembly. The assembly is inserted through opening 81 in main plate 21 until viscous rotor pinion 13 engages with idler gear 12 so that the rotation of hairspring pinion 11 is controlled by the viscous resistance. Cavity 19*c* is prevented from itself rotating by the locking interaction of notched portion 67 and escapement member 80 of idler gear 12 on main plate 21.

In this way, the control mechanism can be optimally formed and flexibly assembled and tested apart from the timepiece. The removable nature of the entire control mechanism also allows for easier repair the timepiece. Finally, the timepiece can be manufactured in the same fashion whether a timepiece with a stepping hand movement or a continuous sweeping hand movement is desired. In the event that a sweeping hand movement is desired the control mechanism can be inserted. Otherwise, the timepiece will function with a stepping hand movement in the absence of the control mechanism. The control mechanism is shown mounted on the main plate side of timepiece 300 but may be mounted on the gear train bridge side and can be formed in a variety of shapes and sizes.

Accordingly, an electronic timepiece which stores discrete rotational energy as either the elastic deformation force of a hairspring or other elastic member or the magnetic attraction force between magnetic materials and which then discharges the stored rotational energy gradually through a control means, either with a viscous rotor and viscous resistance or a magnetic escapement is provided. In each case the storage mechanism and control mechanism are separately formed. This enables smooth, sweeping hand movement. The constructions described above are not limited to the specific embodiments shown and described. In addition, Applicant's invention may be applied to the conversion of discrete rotational energy to continuous sweeping motion in applications beyond timepieces.

In the timepiece embodiments, a sweeping hand movement which incorporates the extremely accurate timekeeping qualities of the quartz system as well as the ability to prevent increases in thickness of the timepiece or shortening of the life expectancy of the battery cell used to operate the timepiece is achieved.

Accordingly, an analog timepiece which converts intermittent stepping motion of the timekeeping circuitry to a continuous sweeping hand display by separating the mechanism for storing the rotational energy and the control mechanism for smoothly releasing the stored energy is provided.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electronic timepiece including a transducer operable for producing an intermittent driving force and a hand operable for continuous rotation based on the intermittent driving force, further comprising:

energy storage means coupled to the transducer for converting the intermittent driving force to stored energy;

control means for continuously releasing the stored energy as a continuous driving force; and linkage means coupled between the energy storage means and control means for transmitting the continuous driving force between the energy storage means and control means, for separating the energy storage means from the control means and for continually rotatably driving the hand.

2. The electronic timepiece of claim 1, wherein the energy storage means includes a hairspring, the energy being stored as deformation restoration energy of the hairspring.

3. The electronic timepiece of claim 1, wherein the energy storage means includes a driving magnet and a following magnet which are spaced apart, the energy being stored as the attractive force between the driving magnet and the following magnet due to the angular deviation therebetween.

4. The electronic timepiece of claim 1, wherein the control means includes a rotor submersed in a viscous fluid.

5. The electronic timepiece of claim 1, wherein the control means includes a pendulum and escapement gear.

6. The electronic timepiece of claim 2, wherein the control means includes a rotor submersed in a viscous fluid.

7. The electronic timepiece of claim 3, wherein the control means includes a rotor submersed in a viscous fluid.

8. The electronic timepiece of claim 3, wherein the control means includes a pendulum and escapement gear.

9. The electronic timepiece of claim 1 wherein the linkage means include a gear train between the energy storage means and the control means and the hand is connected to the gear train.

10. The electronic timepiece of claim 2, wherein the energy storage means further comprises a hairspring gear driven by the discrete driving rotation and coupled to a first end of the hairspring, and a hairspring pinion coupled to the other end of the hairspring and to the control means through the linkage means, whereby continuous sweeping rotation of the hairspring pinion results.

11. The electronic timepiece of claim 4, further comprising a container with a cavity, the cavity containing the rotor and viscous fluid.

12. The electronic timepiece of claim 11, further comprising a rotor pinion connected to the rotor for co-rotation with the rotor.

13. The electronic timepiece of claim 12, wherein at least one of the container and the rotor pinion is provided with a fluid repellent treatment.

14. The electronic timepiece of claim 12, further comprising a cap coupled to the container for sealing the viscous fluid in the cavity, a gap being formed between the center of the cap and the rotor pinion.

15. The electronic timepiece of claim 14 when at least one of the container and the rotary pinion is provided with a fluid repellent treatment proximate the gap.

16. The electronic timepiece of claim 14, wherein the center of the cap is curved upward to form a narrow extended gap between the cap and rotor pinion.

17. The electronic timepiece of claim 14, wherein a magnetic fluid fills the gap and a magnetic circuit maintains the magnetic fluid in the gap.

18. The electronic timepiece of claim 5, wherein the escapement gear is surrounded on both sides by the pendulum.

19. The electronic timepiece of claim 5, wherein there are two escapement gears surrounding the pendulum.

20. The electronic timepiece of claim 1, wherein the linkage means includes at least one idler gear for spacing the energy storage means apart from the control means, whereby flexible arrangement of the components to assemble a thin timepiece is provided.

21. An electronic timepiece including a transducer operable for producing a discrete rotatable driving force and a hand operable for continuous rotation based on the discrete driving force, further comprising:

energy storage means coupled to the transducer for converting the discrete driving force to stored energy;

a rotor submersed in a viscous fluid; and linkage means coupled between the energy storage means and viscous rotor for transmitting the stored energy to the rotor causing the rotor to continuously rotate based on the resistance of the rotor to rotation in the viscous fluid and the transmitted stored energy and for separating the energy storage means from the rotor and wherein the linkage means couples the hand to the rotor to drive the hand in a continuous manner.

22. The electronic timepiece of claim 21, wherein the energy storage means includes a hairspring, the energy being stored as deformation restoration energy of the hairspring.

23. The electronic timepiece of claim 21, wherein the energy storage means includes a driving magnet and a following magnet which are spaced apart, the energy being stored as the attractive force between the driving magnet and the following magnet due to the angular deviation therebetween.

24. The electronic timepiece of claim 21, wherein the linkage means include a gear train between the energy storage means and the control means and the hand is connected to the gear train.

25. The electronic timepiece of claim 24 wherein the linkage means includes at least one idler gear for spacing the energy storage means apart from the control means, whereby flexible arrangement of the components to assemble a thin timepiece is provided.

26. The electronic timepiece of claim 22 wherein the energy storage means further comprises a hairspring gear driven by the discrete driving rotation and coupled to a first end of the hairspring, and a hairspring pinion coupled to the other end of the hairspring and to the control means through the linkage means, whereby continuous sweeping rotation of the hairspring pinion results.

27. An electronic timepiece including a transducer operable for producing a discrete rotatable driving force and a hand operable for continuous and discrete rotation based on the discrete driving force, further comprising: p1 energy storage means coupled to the transducer for converting the discrete driving force to stored rotational energy;

removable control means for continuously releasing the stored rotational energy; and linkage means coupled between the energy storage means, hand and removable control means for transmitting rotational energy to the hand in a continuous sweeping manner when the removable means is coupled to the linkage means, for separating the energy storage means from the control means and for driving the hand in a discrete manner when the removable control means is uncoupled from the linkage means.

28. The electronic timepiece of claim 1, wherein the storage means stores several steps of the interval rotation.

29. The electronic timepiece of claim 1, further including linkage control means coupled to the linkage means for selectively preventing transmission of continuous rotation by the linkage means.

30. The electronic timepiece of claim 29, wherein the linkage control means includes a control lever.

31. An apparatus which includes a member operable for continuous rotatable motion, comprising:

signal means for providing a reference signal;

transducer means for producing an intermittent driving force based on the reference signal;

a gear train torquingly driven in a predetermined direction by the transducer means;

a member directly coupled to the gear train and between the control means and transducer means; and control means coupled to the gear train for opposing the predetermined direction in which the gear train is torquingly driven by the transducer means;

whereby the member continually rotates.

* * * * *